US009652898B2

(12) United States Patent
Ramadei et al.

(10) Patent No.: US 9,652,898 B2
(45) Date of Patent: May 16, 2017

(54) MAIL CREATION SYSTEM WITH IMPROVED CONTROL OF PRINT-DATA DOWNLOADING

(75) Inventors: Michael J. Ramadei, Trumbull, CT (US); David R. Welch, Shelton, CT (US); James A. Fairweather, Milford, CT (US); Wesley A. Kirschner, Farmington, CT (US); David J. Eaton, Newtown, CT (US)

(73) Assignee: Pitney Bowes Inc., Stamford, CT (US)

( * ) Notice: Subject to any disclaimer, the term of this patent is extended or adjusted under 35 U.S.C. 154(b) by 2561 days.

(21) Appl. No.: 11/512,527

(22) Filed: Aug. 30, 2006

(65) Prior Publication Data

US 2008/0077414 A1 Mar. 27, 2008

(51) Int. Cl.
*G06F 17/00* (2006.01)
*G06G 7/00* (2006.01)
*G07B 17/00* (2006.01)

(52) U.S. Cl.
CPC .................. *G07B 17/00467* (2013.01); *G07B 2017/00241* (2013.01); *G07B 2017/00491* (2013.01)

(58) Field of Classification Search
CPC .... G06Q 2250/00; G06Q 50/32; G07B 17/00; G07B 17/00508; G07B 2017/00637; G07B 2017/00572
USPC ........................................................ 705/1, 401
See application file for complete search history.

(56) References Cited

U.S. PATENT DOCUMENTS

| | | | | |
|---|---|---|---|---|
| 5,283,752 | A | 2/1994 | Gombault et al. | 364/478 |
| 6,338,479 | B1 * | 1/2002 | Van Der Werff et al. | 271/3.01 |
| 2005/0111045 | A1 * | 5/2005 | Imai | 358/1.18 |
| 2005/0214017 | A1 * | 9/2005 | Isobe et al. | 399/82 |

FOREIGN PATENT DOCUMENTS

| | | | | |
|---|---|---|---|---|
| EP | 1 016 468 | A1 | 7/2000 | B07C 1/00 |
| EP | 1 288 851 | A1 | 3/2003 | G06K 15/00 |

* cited by examiner

*Primary Examiner* — George Chen
(74) *Attorney, Agent, or Firm* — Steven J. Shapiro; Charles R. Malandra, Jr.

(57) ABSTRACT

An apparatus includes a printer and a buffer coupled to the printer for temporarily storing sheets fed out from the printer. The apparatus further includes a control mechanism for monitoring the buffer to determine a number of sheets currently stored in the buffer. The apparatus also includes a data source device that is separate from the printer and is coupled to the printer for selectively providing pages of print data to the printer. The data source device is coupled to the control mechanism and is operative to provide the pages of print data to the printer in response to control signals from the control mechanism.

4 Claims, 9 Drawing Sheets

MAIL CREATION SYSTEM WITH IMPROVED CONTROL OF PRINT-DATA DOWNLOADING

BACKGROUND

This invention relates generally to systems which generate mail pieces and is more particularly concerned with managing differences in operating rates among components of such systems.

In a typical mail-creation system, a personal computer or the like generates data that represents text and/or images to be printed on sheets of paper. A printer is in data communication with the personal computer and receives downloads of print data. The printer prints the downloaded data on sheets of paper. An inserter or other mail-assembling machinery receives, directly or indirectly, printed sheets that are outfed from the printer. The inserter folds and/or otherwise manipulates the printed sheets and inserts them in envelopes to generate mail pieces.

One issue that must usually be faced in designing a mail-creation system is that the constituent components of such a system may tend to operate at different rates. For example, the personal computer may be capable of generating pages of print data at an extremely rapid rate, reflecting the high speed of operation of modern microprocessors and other PC components. Usually the printer component of the mail-creation system is not able to operate nearly as fast as the PC. For that reason, a conventional software component known as a "spooler" is customarily included in PCs so that the PC downloads pages of print data to the printer only at a rate that matches the printer's ability to print pages.

On the other hand, it is frequently the case that inserters are capable of operating at a much faster speed than the printer component of the system. However, inserters do not always operate at their highest possible rates, but rather may be subject to hesitations or jam events which may greatly slow or even halt the inserter's operation on certain occasions. During such occasions, the printer operating rate may outstrip that of the inserter. Also, there are situations in which the inserter runs more slowly than the printer, even without hesitations or jams. For example, in a job where the inserter receives one sheet from the printer and adds more sheets from the inserter's feeder(s), the inserter may require sheets from the printer at a lower rate than the printer is capable of providing them.

There are several conventional techniques for dealing with a possible and/or temporary mismatch between the operating rates of the inserter and the printer.

According to one technique, a large mechanical sheet buffer may be installed in the paper flow path between the printer and the inserter. In this context, the term "large" indicates that the sheet buffer is able to buffer numerous printed sheets of paper after the same are outfed from the printer and before the sheets are infed to the inserter. This technique may be disadvantageous in that the sheet buffer may be quite expensive and may occupy a great deal of space. Moreover, this technique cannot cope with a situation where the steady-state operating rate of the inserter is less than that of the printer, since the buffer is virtually certain to overflow in such a case.

According to a second technique, a sheet-diversion mechanism may be coupled to the paper feed path between the printer and the inserter. The sheet-diversion mechanism may operate to divert the flow of sheets away from the inserter on occasions when the inserter operating rate effectively falls behind that of the printer. Data to generate duplicates of the diverted sheets may be downloaded to the printer from the PC once the inserter recovers its normal operating speed. The diverted sheets may be discarded.

One disadvantage of the latter technique is possible wastage of the diverted sheets. Further, it may not be practical to employ this technique when it is intended that the mail pieces be produced in a fixed order. In the situation where the steady-state operating rate of the inserter is less than that of the printer, this technique would require diverting sheets on a regular basis.

A third technique calls for a control signal connection from the inserter control device back to the printer. For this technique a customized firmware program is incorporated in the printer to allow the operation of the printer to be halted or slowed down in response to a control signal from the inserter control device when the inserter control device detects a need to do so on account of an event in the inserter. A disadvantage with respect to this technique may be encountered if it is desired to replace the printer in the mail-creation system with a different model of printer. The expense and time required to write the necessary custom firmware for the desired replacement printer may increase the cost and lead time entailed by introducing the new printer into the mail-creation system.

SUMMARY

According to an aspect of the invention, an apparatus includes a printer and a buffer coupled to the printer for temporarily storing sheets fed out from the printer. The apparatus also includes a control mechanism for monitoring the buffer to determine a number of sheets currently stored in the buffer. In addition, the apparatus includes a data source device separate from the printer and coupled to the printer for selectively providing pages of print data to the printer. The data source device is coupled to the control mechanism and is operative to provide pages of print data to the printer in response to control signals from the control mechanism.

The data source device may be a personal computer or may alternatively be integrated with the control mechanism. A mail-assembling device such as an inserter may be coupled to the buffer to receive sheets output from the buffer. The printer may be a laser printer or any other type of printer used to generate a constituent element of a mail piece.

According to another aspect of the invention, a method includes receiving signals indicative of entry of sheets into a sheet buffer and exit of sheets from the sheet buffer. As a further step of the method, and based at least in part on the received signals, the number of sheets currently stored in the sheet buffer is determined. Also, based at least in part on the determined number of sheets currently stored in the sheet buffer, a source of print data is controlled to selectively download pages of print data to a printer for printing on sheets to be output from the printer to the sheet buffer.

The source of print data may be controlled to allow the printer to operate at a maximum rate of the printer so long as the sheet buffer does not become full. Controlling the source of print data may include providing control signals to a language monitor software component running in a personal computer. Such control signals may include signals requesting the language monitor software component to release at least one page of print data to the printer. Alternatively, the control signals may include signals to indicate that the sheet buffer is ready to accept at least one more sheet from the printer. The control signals may reflect at least one multi-sheet collation in the sheet buffer.

As used herein and in the appended claims, a "collation" refers to a group of one or more printed sheets appointed for inclusion in a single mail piece. The term "sheet" refers to any generally flat piece of paper, and includes an envelope or other folded piece of paper.

According to yet another aspect of the invention, a mail-creation system includes a personal computer. The personal computer runs (a) an application program to provide print data, (b) a printer driver software component to receive the print data from the application program, (c) a spooler software component to receive the print data from the printer driver software component, and (d) a language monitor software component to receive the print data from the spooler software component. The system also includes a printer coupled to the personal computer to receive the print data from the personal computer and a sheet buffer coupled to the printer to receive printed sheets from the printer. The system further includes an inserter coupled to the sheet buffer to receive printed sheets from the sheet buffer and to insert the printed sheets into envelopes and/or to fold the sheets. In addition, the system includes a control module coupled to the sheet buffer to detect entry of sheets into the sheet buffer and exit of sheets from the sheet buffer. The control module is also coupled to the personal computer to provide signals to the language monitor software component. The signals request the language monitor to release at least one page of print data to the printer.

The sheet buffer, in some embodiments, may have exactly six sheet storage positions and may have a sheet transport path that is substantially reverse S-shaped.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention, in its various aspects, manages potential mismatches between operating rates of a printer and an inserter in a mail-creation system by interposing a relatively small sheet buffer between the printer and the inserter while managing the flow of print data to the printer based on the extent to which there is space available in the sheet buffer. With this technique, operation of the printer may be completely conventional, and no custom-programming of the printer is required. In some embodiments, a small software modification is made to a so-called "language monitor" software component of the personal computer (PC) that drives the printer. The modification of the language monitor need not entail significant difficulty or expense. A control module associated with the inserter monitors the state of the sheet buffer (i.e., monitors the extent to which space is available in the sheet buffer) and communicates with the language monitor to control release of pages of print data from the PC to the printer.

Another significant aspect of the control system is that, in addition to supporting use of a relatively small buffer, the control system is designed to handle asynchronous cycle rates that vary between the printer and inserter. The control algorithm may adapt the timing of commitment of sheets to the printer depending upon whether the printer is momentarily faster or slower than the inserter. Also, the control algorithm may adapt to changes in the relative speeds of the printer and inserter. The changes in relative speed may occur as a result of intended situations (e.g., extra contents inserted into a particular mail piece) or unintended situations, such as a temporary hesitation in the inserter due to a mis-feed.

Figure 1:
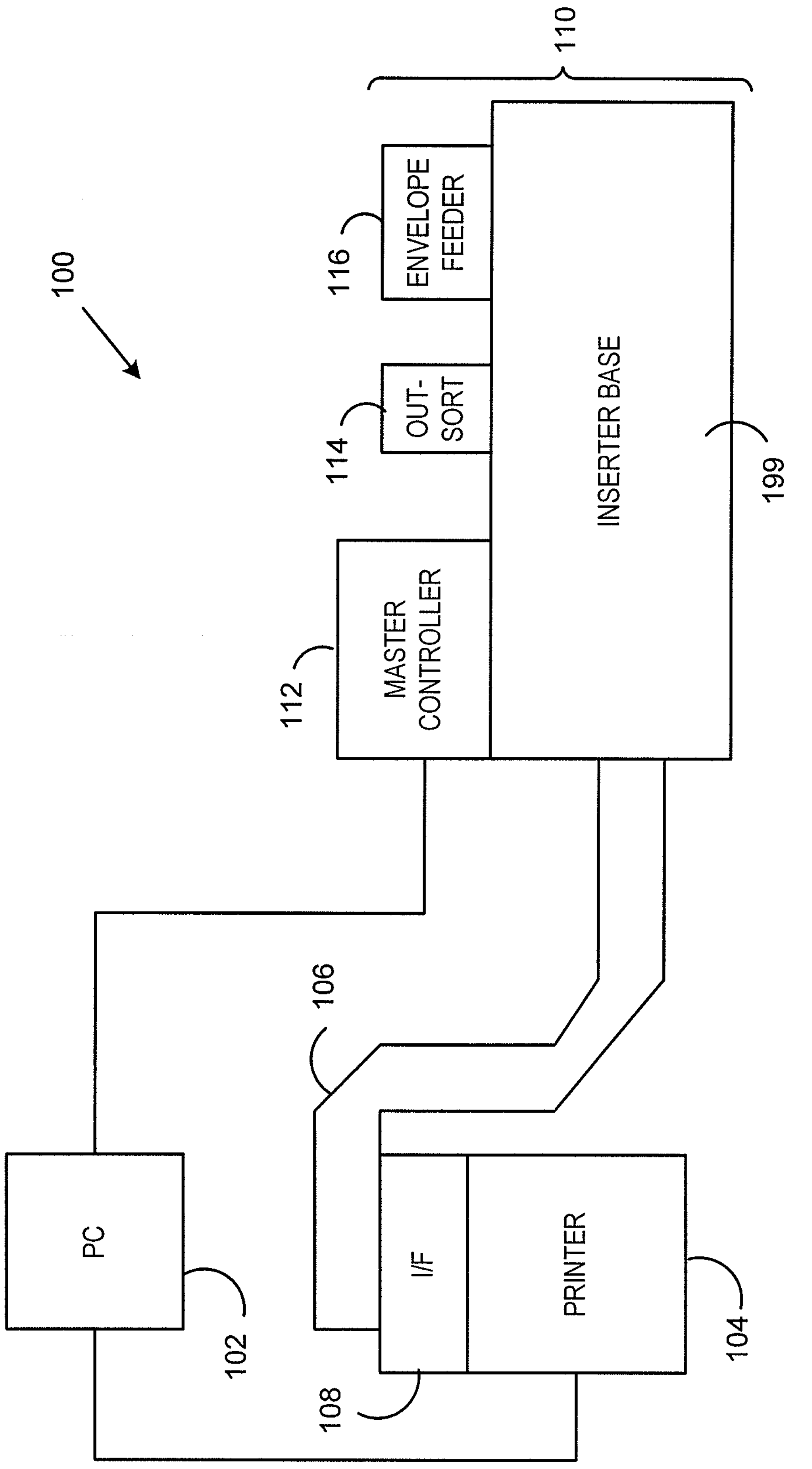
FIG. 1 is a schematic block diagram of a mail-creation system provided in accordance with an embodiment of the invention.

FIG. 1 is a schematic block diagram of a mail-creation system 100 provided in accordance with an embodiment of the invention.

The mail creation system 100 includes a PC 102 and a printer 104 coupled to the personal computer to receive print data from the PC 102. The PC 102 may function as the sole or primary source of data to be used in generating the mail pieces to be created by the mail-creation system 100. The printer 104 may print some or all of the documents that form the contents of the mail pieces created by the mail-creation system 100. In printing those documents, the printer 104 may be driven by the print data downloaded to it from the PC 102. The printer 104 itself may be entirely conventional and indeed may be an "off-the-shelf" item. The PC 102 may be substantially conventional in its operation except for a relatively minor software modification as indicated below.

The mail creation system 100 further includes a mechanical sheet buffer 106 coupled to the printer 104 to receive sheets output from the printer 104 via a mechanical interface 108. The sheet buffer 106 may be constructed substantially in accordance with conventional principles, except that the sheet buffer 106 may be configured and sized so as to promote efficient operation of the mail-creation system. Certain details of the configuration and functioning of the sheet buffer 106 will be provided below.

Still further, the mail creation system 100 may include an inserter 110 (or another type of mail-assembling device) which is coupled to the sheet buffer 106 to receive printed sheets from the sheet buffer 106. A user interface/control module 112 is associated with the inserter 110 and forms a part of the mail creation system 100. Certain control operations performed by the control module 112 represent significant aspects of the present invention. Except for modifications to the (e.g., software and/or firmware of) the control module 112, the inserter 110 may be conventional in its structure and operation. For example, the inserter 110 may include an inserter base 199 an outsort module 114 for outsorting papers/mail pieces to be diverted from the normal process path, and also may include an envelope feeder 116, among other conventional components. The inserter 110 may operate to fold sheets received from the sheet buffer 106 and to insert the folded sheets in envelopes fed from the envelope feeder 116. The control module 112 may include such conventional components of a user interface as a display screen (not separately shown) and a keypad/control buttons, etc. (also not separately shown).

Figure 2:
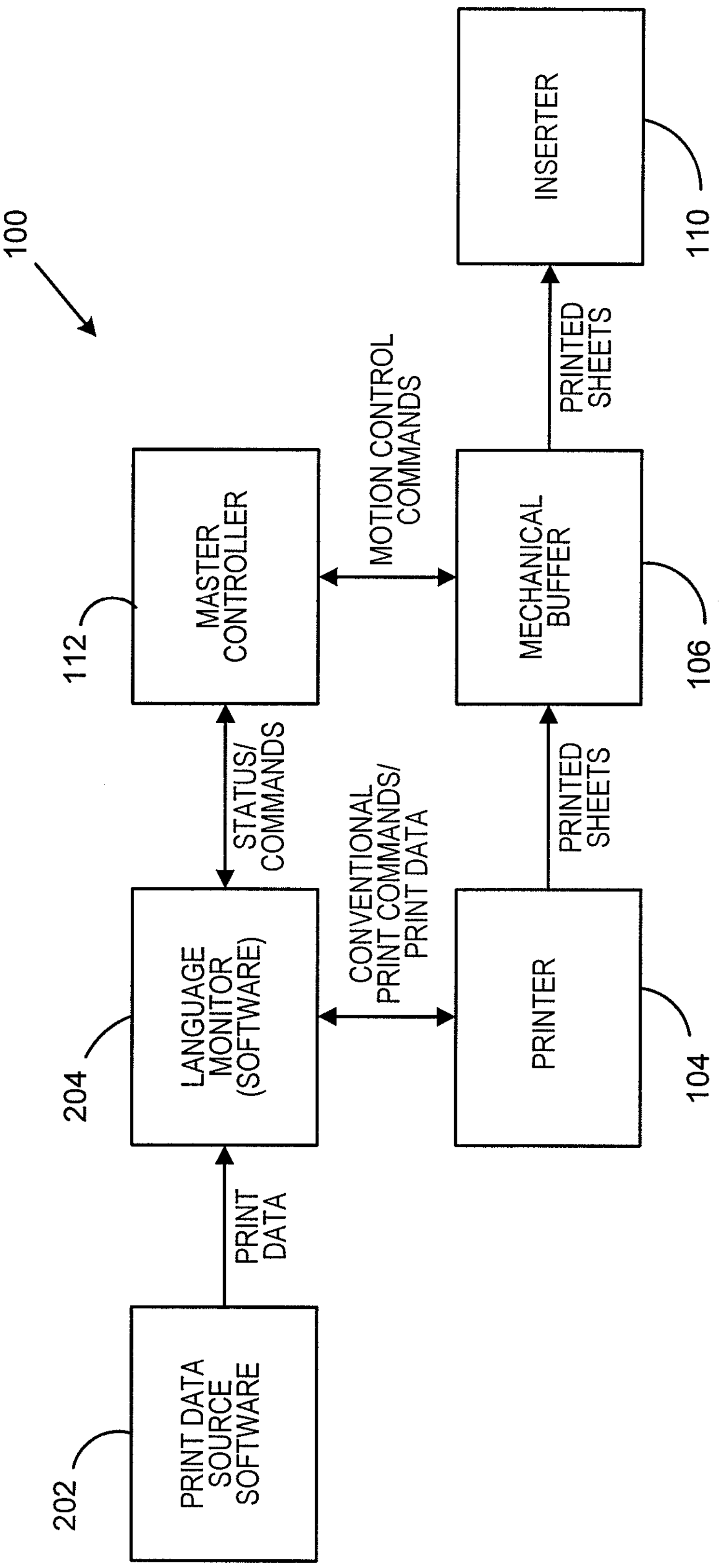
FIG. 2 is a diagram that shows data and other flows among functional components of the mail-creation system of FIG. 1.

FIG. 2 is a diagram that shows data and other flows among functional components of the mail-creation system 100. Certain system components depicted in FIG. 1, such as printer 104, sheet buffer 106, inserter 110 and the inserter control module 112, are each represented as a respective functional block in FIG. 2. The two other functional blocks shown in FIG. 2, respectively indicated by reference numerals 202, 204, represent certain software aspects of the PC 102 (FIG. 1, not explicitly shown in FIG. 2). In particular, block 202 represents print data source software like a word processing application program (e.g., Microsoft Word) or other source of print data, whereas block 204 represents a “language monitor” software component of the PC 102. The language monitor software component is the portion of the PC software which interacts with the control module 112 in accordance with aspects of the present invention.

To summarize the data/command/paper flows illustrated in FIG. 2, pages of text data are transferred from print data software 202 (via, perhaps, other software components that are not shown in FIG. 2) to the language monitor software component 204. The language monitor software component 204, in turn, downloads the pages of text data to the laser printer 104. In doing so, the language monitor software component 204 responds to commands/requests from the inserter control module 112. The inserter control module 112, in turn, may issue its requests to the language monitor software component 204 based on signals which the inserter control module 112 receives from the mechanical buffer 106. In addition, or alternatively, the inserter control module 112 may control the mechanical buffer 106 so that the state of the mechanical buffer 106, including the number of sheets in the buffer 106 and the location of the sheets in the buffer 106, is controlled by the inserter control module 112.

Figure 4:
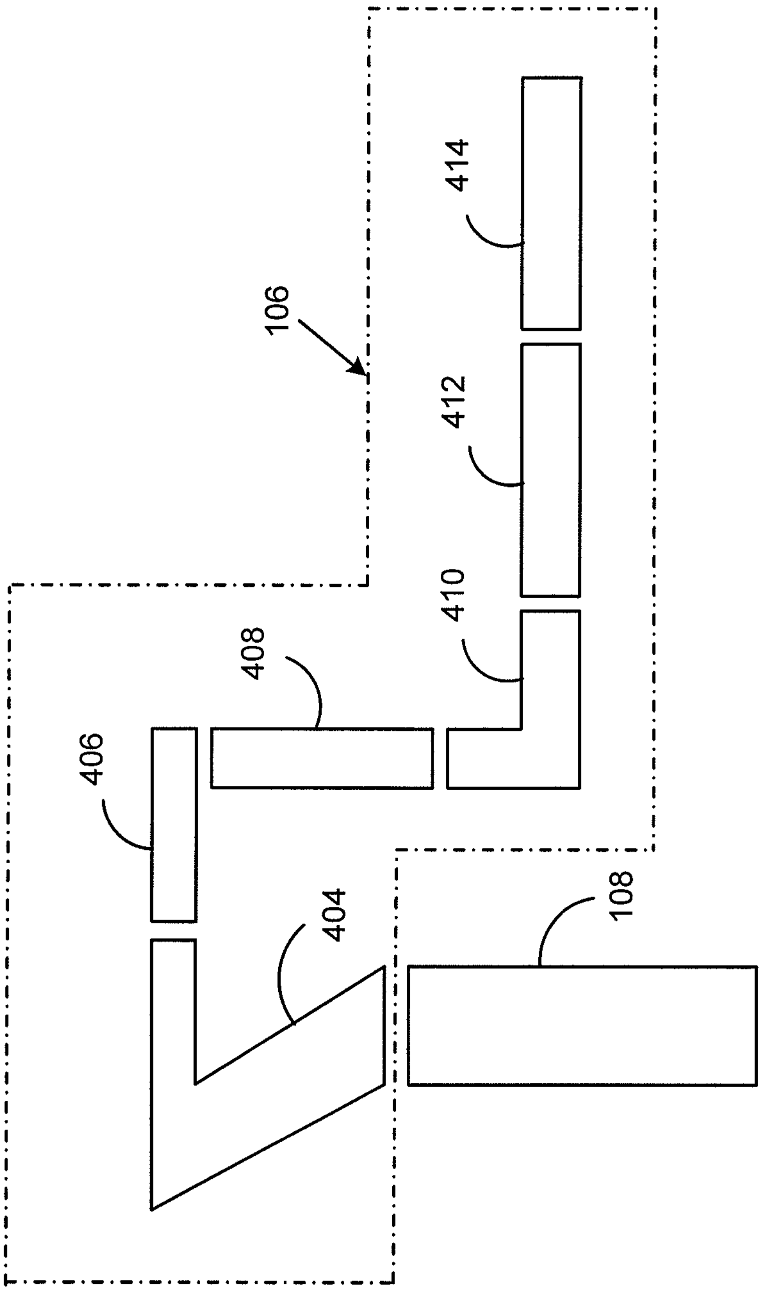
FIG. 4 is a schematic segmented side view of a sheet buffer that is part of the mail-creation system of FIG. 1.

FIG. 4 is a schematic segmented side view which shows some details of the sheet buffer 106. FIG. 4 also shows a mechanical interface 108 which passes printed sheets outfed from the printer (not shown in FIG. 4) to the sheet buffer 106. Each of the six segments shown in FIG. 4 as constituting the sheet buffer 106 is shaped and sized to hold at least one printed sheet. Each segment may be thought of as a “sheet storage position” of the sheet buffer, and thus the sheet buffer 106 is able to store at least 6 sheets at one time. Each sheet storage location of the sheet buffer 106 may, but need not, be capable of holding a standard letter-sized sheet, such as an 8½ in.×11 in. sheet and/or an A4-sized sheet.

Considering again the laser printer 104, printed sheets from the laser printer 104 are fed to the mechanical buffer 106, and are fed out from the buffer 106 to the inserter 110, at which the printed sheets are assembled into mail pieces.

Figure 3:
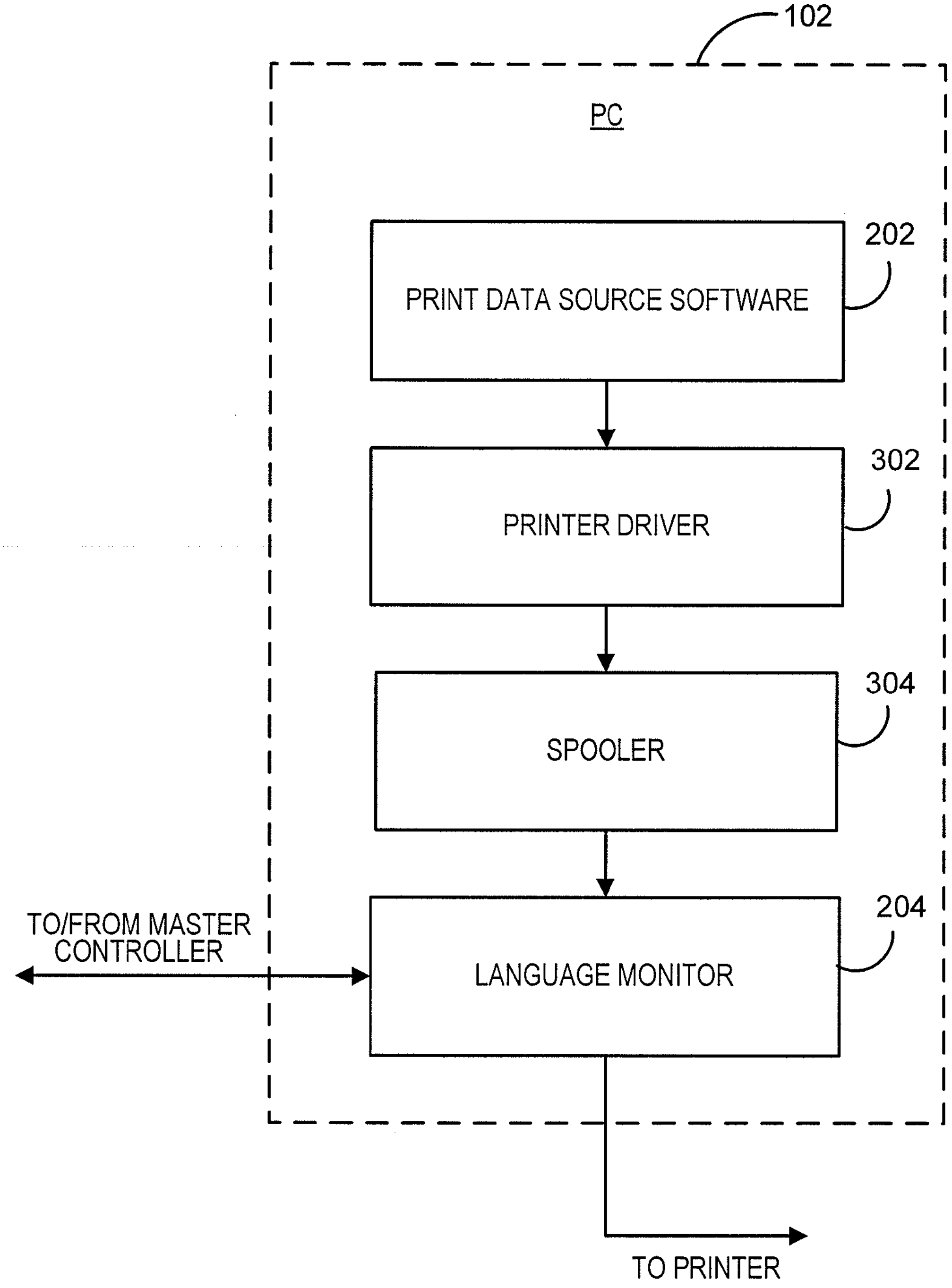
FIG. 3 is a schematic block diagram representation of some aspects of a personal computer that is part of the mail-creation system of FIG. 1.

FIG. 3 is a schematic block diagram representation of some aspects of the PC 102, and may also be considered as providing additional information relative to the data flow representation contained in FIG. 2. As noted above, the PC 102 includes an application program such as a word processing program to generate pages of text to be printed on sheets of paper by the printer 104 (FIGS. 1 and 2). Further software components of the PC 102 include a printer driver 302, a spooler 304, and the above mentioned language monitor 204. All of these software components, including the WP application program, may be entirely conventional, except that the language monitor may have been modified to allow the language monitor to interact with (e.g., to download pages of text in response to requests from) the inserter control module 112 (FIGS. 1 and 2). Thus the flow of print data may be from the WP application to the printer via the printer driver 302, the spooler 304 and the language monitor 204. The language monitor may function as a “throttle” to supply print data to the printer at timings determined by the inserter control module 112 and in a manner designed to maximize printer throughput without overfilling the buffer 106.

Figure 8:
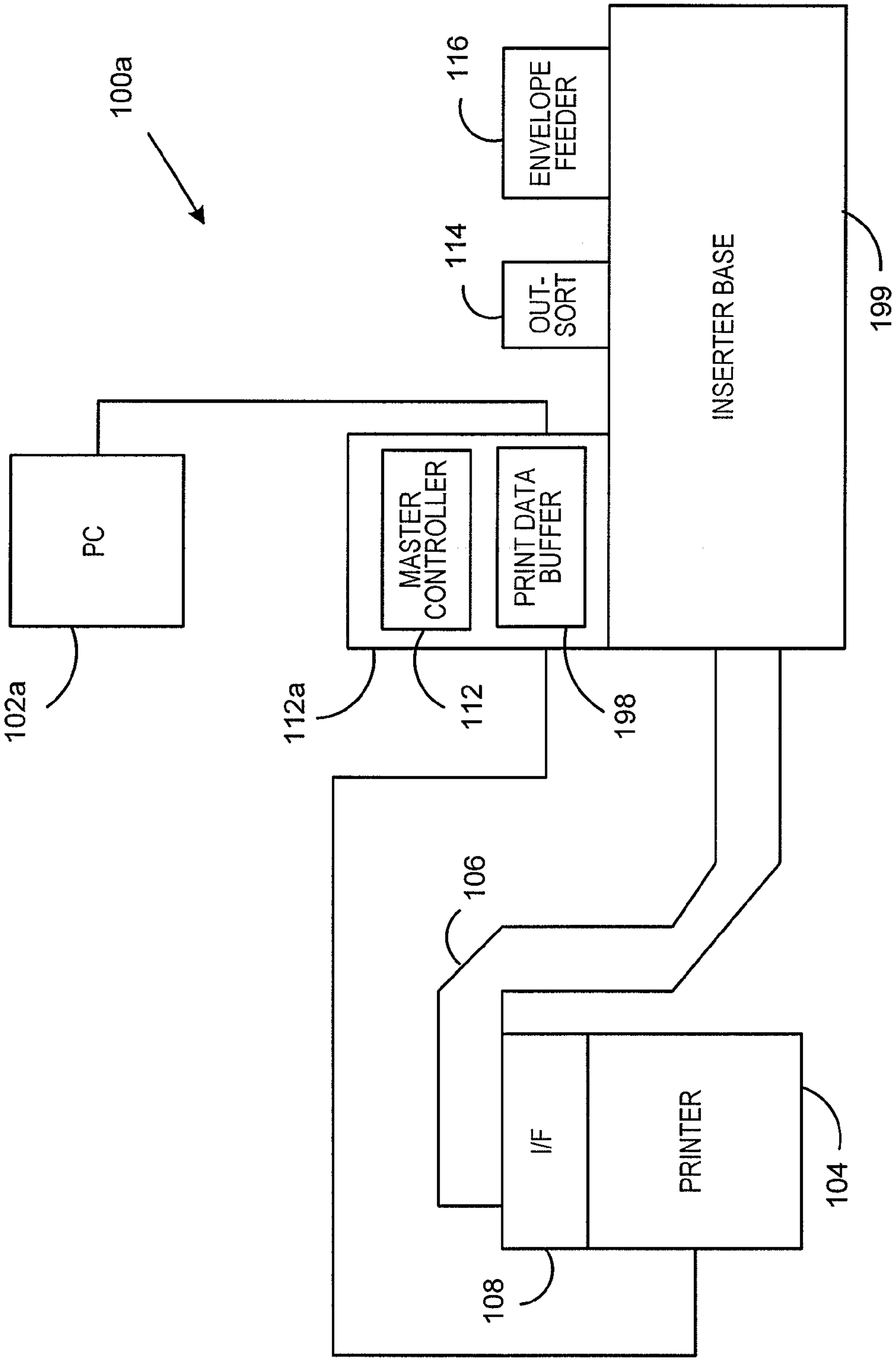
FIG. 8 is a view similar to FIG. 1 of an alternative embodiment of the mail-creation system.

FIG. 8 is a block diagram representation of an alternative embodiment of the mail creation system (indicated generally by reference numeral **100*a* in FIG. 8). In the embodiment of FIG. 8, the inserter control module may include a buffer for print data, and the PC 102*a* may provide the print data to the print data buffer 198 in the inserter control module 112*a* containing master controller 112, from where the print data is selectively downloaded to the printer 104. The inserter control module may control (“throttle”) its own print data buffer 198 in response to the availability of sheet storage space in the sheet buffer 106, in like manner to the inserter control module throttling the language monitor in the embodiment of FIGS. 1-4. In the embodiment of FIG. 8, the language monitor need not be present in the PC 102*a***, or may be completely conventional—i.e., not modified so as to be controlled by the inserter control module. Thus in this case the source of print data (print data buffer) for the printer is integrated with the inserter control module, with the PC serving as an ultimate source of data which supplies print data to the print data buffer portion of the inserter control module. The relevant software portion(s) of the PC may interact with the print data buffer portion of the inserter control module as if the print data buffer portion of the inserter control module were a printer.

The first sheet storage position 404 may function to invert (i.e., flip over) a sheet upon entrance of the sheet into the sheet buffer 106. The second sheet storage position 406 may serve as an exit stage from the inverter segment 404. The next sheet storage position 408 may be referred to as a “vertical transport” segment in that the segment 408 vertically downwardly transports the current sheet away from the inverter exit 406, at times when the sheet is moving through the segment 408. Of course, as is the case with all of the segments, there may also be times when a sheet is held in a stationary condition in the segment 408.

The fourth sheet storage position 410 may function to pass the sheet past a barcode scanner (not separately shown). The sheets may carry one or more barcodes to indicate whether or not each sheet is part of a larger collation, and the barcode scanner referred to in the previous sentence may read the barcodes and provide, to the inserter control module 112 (FIGS. 1 and 2, not shown in FIG. 4), signals indicative of the data encoded in the barcodes. Based on such data, the inserter control module 112 may control the sheet buffer 106 to accumulate the constituent sheets of each multi-sheet collation at the next sheet storage position, which is shown as segment 412. When a collation is complete, and if the overall operation of the sheet buffer allows, the collation may then be passed to the next sheet storage position 414, which serves as an exit stage from the accumulator sheet position 412. From sheet storage position 414, individual sheets (in the case of single-sheet collations) or entire multi-sheet collations are fed into the inserter 110 (FIG. 1, not shown in FIG. 4).

Thus, as will be readily seen from FIG. 4, sheet storage position 404 is in the most upstream location in the sheet buffer 106; sheet storage position 406 is immediately downstream from sheet storage position 404; sheet storage position 408 is immediately downstream from sheet storage position 410; sheet storage position 412 is immediately downstream from sheet storage position 410; and sheet storage position 414 is immediately downstream from sheet storage position 412. As seen from FIG. 1, the inserter 110 is downstream from sheet storage position 414.

Those who are skilled in the art will appreciate that each of the sheet storage positions 404-414 may include one or more sensors, switches, motors, roller-pinches, guides and the like (all not separately shown) to allow each stage to selectively hold or pass a sheet (or a multi-sheet collation, in the cases of sheet storage positions 412, 414) under the control of the inserter control module 112 (FIGS. 1 and 2, not shown in FIG. 4). Signal path connections between the control module and the sheet storage position components may be present but are not shown. It will also be understood that the segments 404-414, although schematically illustrated in FIG. 4 as having gaps between them, may in practice be mechanically joined together so as to provide a continuous sheet storage and feed path from the printer to the inserter. Although not shown in the drawing, a sheet diversion mechanism may also be included in the sheet buffer 106.

Figure 5:
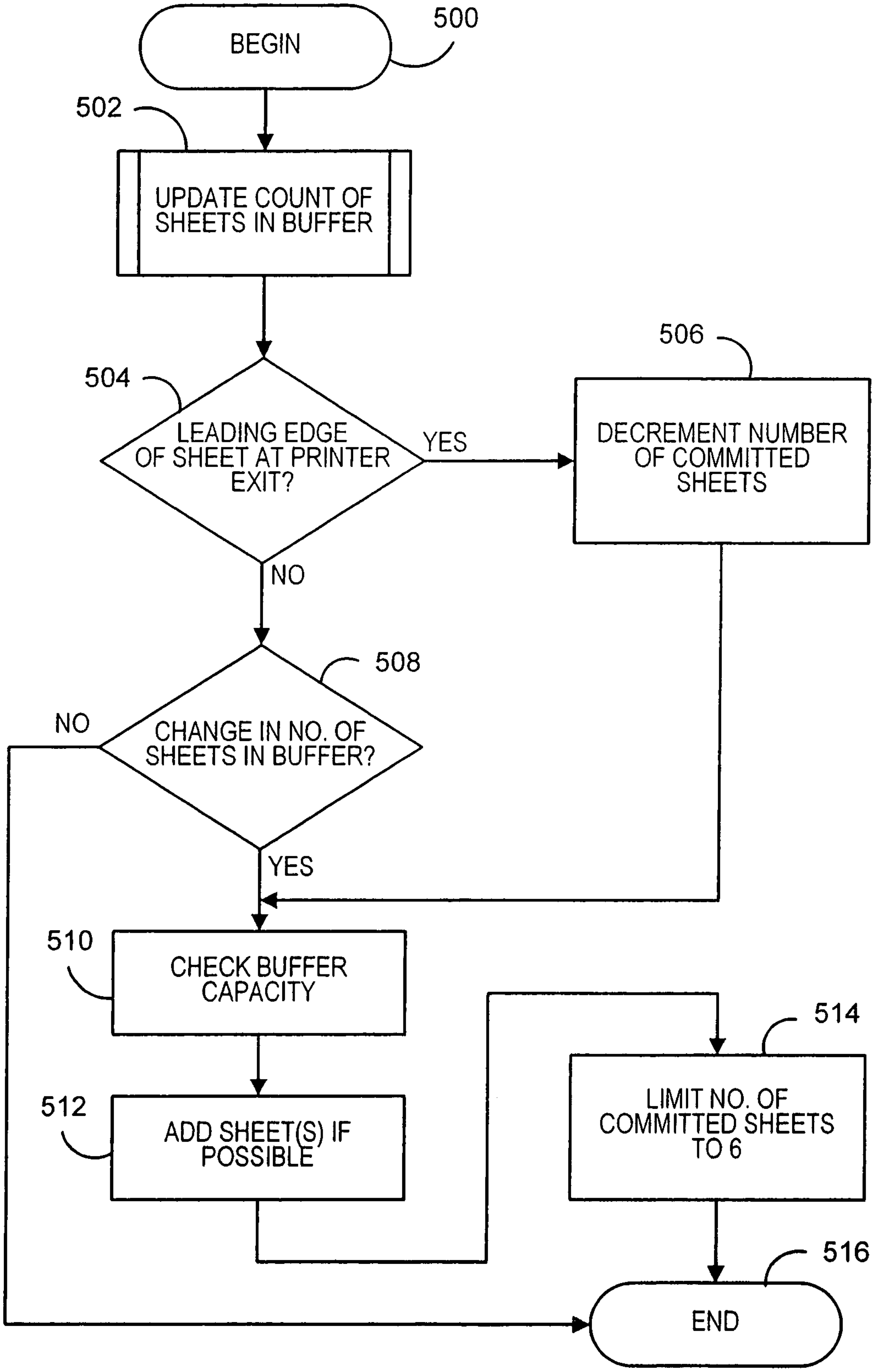
FIG. 5 is a flow chart that illustrates a process that may be performed by a control module that is part of the mail-creation system of FIG. 1.

FIG. 5 is a flow chart that illustrates a process that may be performed by the inserter control module 112 in accordance with aspects of the present invention. The process of FIG. 5 begins at 500 and advances to a process step 502 at which the inserter control module 112 updates its count of the number of sheets currently in the sheet buffer 106. (Details of the process step 502 will be discussed below in connection with FIG. 6.)

Following step 502 is decision block 504, at which it is determined whether the leading edge of a printed sheet has been detected (via a suitable sensor, not shown) at an exit point of the printer 104. If such is the case, then step 506 follows, at which the inserter control module 112 decrements the number of sheets which, according to a count maintained by the inserter control module 112, had theretofore been committed for printing to the printer 104. However, if a negative determination is made at decision block 504 (i.e., if the leading edge of a sheet was not detected at the exit from the printer), then decision block 508 follows decision block 504. At decision block 508, it is determined whether there has been a change in the number of sheets held in the buffer. If so, then step 510 follows at which the inserter control module determines whether the buffer has a capacity to handle a sheet or sheets in excess of the number already committed to printing. If such is the case, then, at step 512, the inserter control module instructs the language monitor to commit an additional sheet or sheets for printing to the printer. In any event, the number of sheets committed does not exceed six sheets (corresponding to the six storage positions in the buffer), as indicated at step 514. After step 514, the process ends 516, which may result in the process looping back to "begin" 500.

It will also be recognized from FIG. 5, that following step 506, if that branch is taken, are steps 510-516 as discussed above.

Also considering again decision block 508, if a negative determination is made at that point (i.e., if there has been no change in the number of sheets in the buffer), then the process ends 516 after decision block 508, subject as before to looping back to 500.

The communication between the inserter control module and the language monitor may be handled in a number of different ways. In a preferred embodiment, the inserter control module sends requests to the language monitor requesting the language monitor to commit a sheet or sheets of print data to the printer. For example, upon start-up, the inserter control module may request the language monitor to commit six sheets of print data to the printer, and the language monitor may send a message back to the inserter control module to indicate that the language monitor has committed the six sheets of print data to the printer. Thereafter, as buffer capacity permits, the inserter control module may send requests to the language monitor requesting that the language monitor commit single sheets of print data to the printer, and in each case the language monitor may send a message back to the inserter control module to indicate that the language monitor has committed the requested sheet of print data to the printer. This method of controlling the flow of print data to the printer may be considered to be "buffer driven".

The messaging between the inserter control module and the language monitor, and the operation of the mail creation system may be such that rapid messaging is not required. Rather, in some embodiments, it need not be necessary for a message response to be provided sooner than 500 milliseconds after the previous message was received.

As an alternative to the buffer driven control approach, a "PC driven" control approach may be employed. With this approach, the language monitor may, possibly at regular intervals, or as rapidly as needed to keep the printer operating at maximum speed, query the inserter control module as to whether there is space available in the sheet buffer. The inserter control module may then respond to these queries by indicating either that space is or is not available in the sheet buffer. A possible disadvantage of this approach is increased use of bandwidth for polling and responses to polling, some of which may be wasted at times when there is no available space in the buffer.

In both the buffer driven and PC driven approaches, it should be understood that the language monitor is providing pages of print data to the printer in response to control signals from the inserter control module; in the PC driven approach, the responses from the inserter control module to polling from the language monitor may be considered to be control signals at least in that the inserter control module's responses control whether the language monitor downloads pages of print data to the printer.

Figure 6:
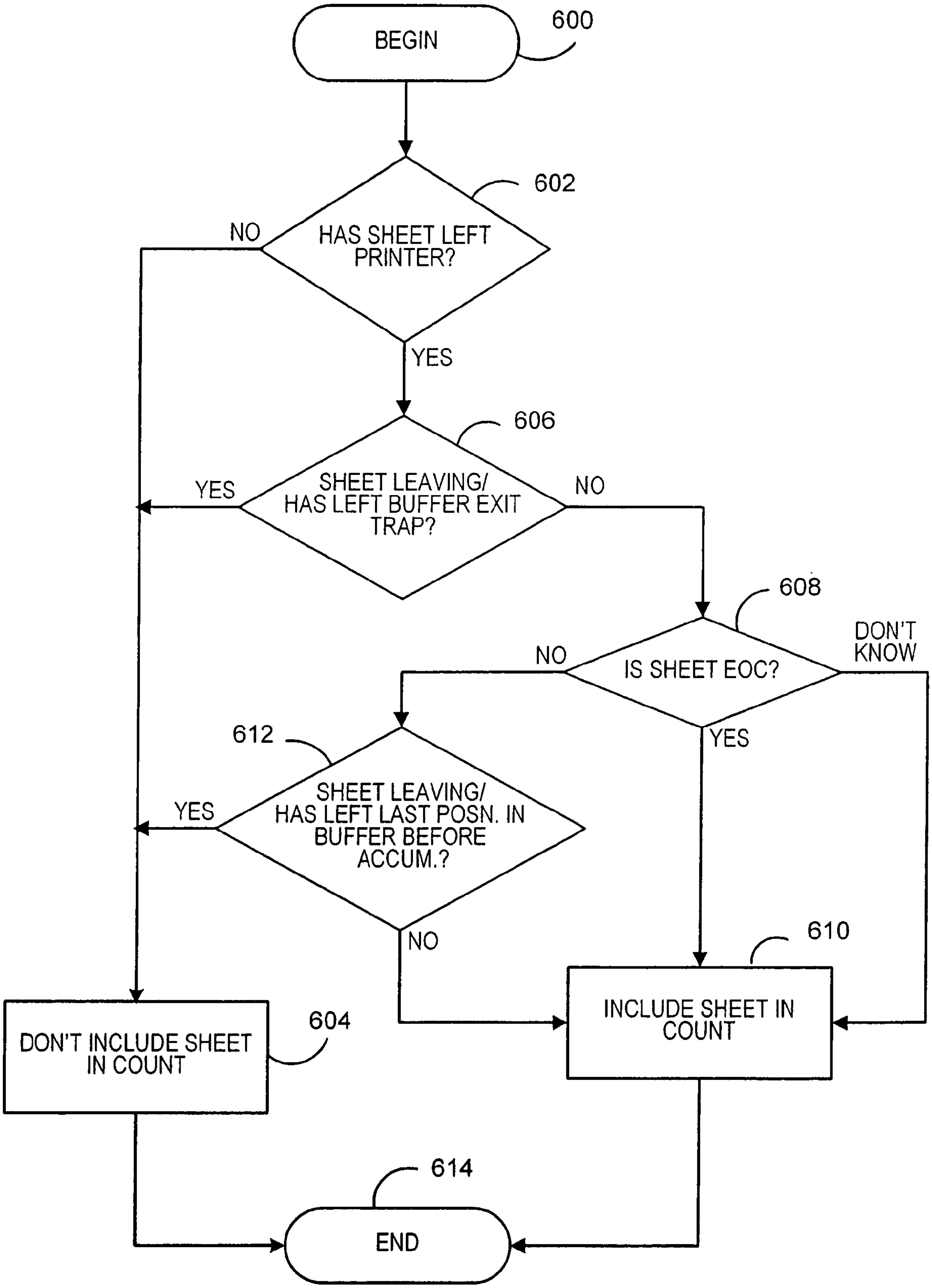
FIG. 6 is a flow chart that illustrates some details of the process of FIG. 5.

FIG. 6 is a flow chart that illustrates details of block 502 ("update count of sheets in buffer") of FIG. 5. The process of FIG. 6 begins at 600 and advances to a decision block 602 at which it is determined whether a sheet has left the printer. If not, then as indicated at 604 the sheet is not included in the count of sheets in the buffer. Considering decision block 602 again, if it is determined at that block that the sheet has left the printer, then decision block 606 follows. At decision block 606 it is determined whether the sheet has left or is leaving the last sheet storage position (segment 414, FIG. 4)

of the sheet buffer. If a positive determination is made at 606, then again the sheet is not included (step 604) in the count of sheets in the buffer.

If a negative determination is made at decision block 606, then decision block 608 follows. At decision block 608, it is determined whether the sheet is the last sheet in a collation ("end of collation", or "EOC"). If so, or if it is not known whether the sheet is the last in a collation, then the sheet is included in the count of sheets in the buffer (step 610). If a negative determination is made at 608 (i.e., the sheet is not the last of a collation), then decision block 612 follows. At decision block 612 it is determined whether the sheet is leaving or has left the last sheet storage position (segment 410, FIG. 4) before the accumulator storage position (segment 412, FIG. 4). If a positive determination is made at 612, then the sheet is not included in the count of sheets in the buffer (step 604). If a negative determination is made at 612, then the sheet is included in the count of sheets in the buffer (step 610). The process of FIG. 6 may be applied with respect to every sheet that is in or bound for the sheet buffer.

The end of the process of FIG. 6 is indicated at 614 and occurs when it is determined whether or not to include a sheet in the count of sheets in the buffer.

In the "throttle control" method employed with respect to the language monitor as described above, the pages of print data are effectively provided to the printer in a "burst mode", in that as many pages as possible are provided as fast as possible to the printer consistent with not overfilling the buffer. When the buffer is unable to accept more sheets, downloading of pages of data to the printer is stopped. The present inventors have determined that the burst mode is likely to promote more efficient operation of the printer (maximum throughput) as opposed to another mode in which a constant delay is established between the feeding of sequential pages of data. The present inventors have found that the constant delay mode may tend to result in significant variations in the delay between sheets exiting from the printer, thus reducing throughput.

Still another possible type of control approach could be adaptive in that in such an approach sheets may be committed more rapidly to the printer, when information such as the number of sheet(s) in a mail piece is known and the detection of a mail piece collation boundary can be assessed earlier and thus more sheets committed sooner. Multiple sheets within a collation are accumulated in the Accumulator area. By having more sheets in the buffer (while still providing sufficient storage areas for all the collations and sheets) the buffer may be allowed to deliver more average collations to the inserter if the printer were delayed on startup. Such situations may arise if the inserter pauses temporarily (due to a feeder misfeed), but then resumes automatically (inserter feeder retry is successful), but the delay is sufficiently long for the printer to shut down. By having more sheets in storage with an adaptive method, the restart time of the printer is overlapped with the delivery of the sheets from the buffer system, resulting in slightly higher overall throughput.

Figure 7:
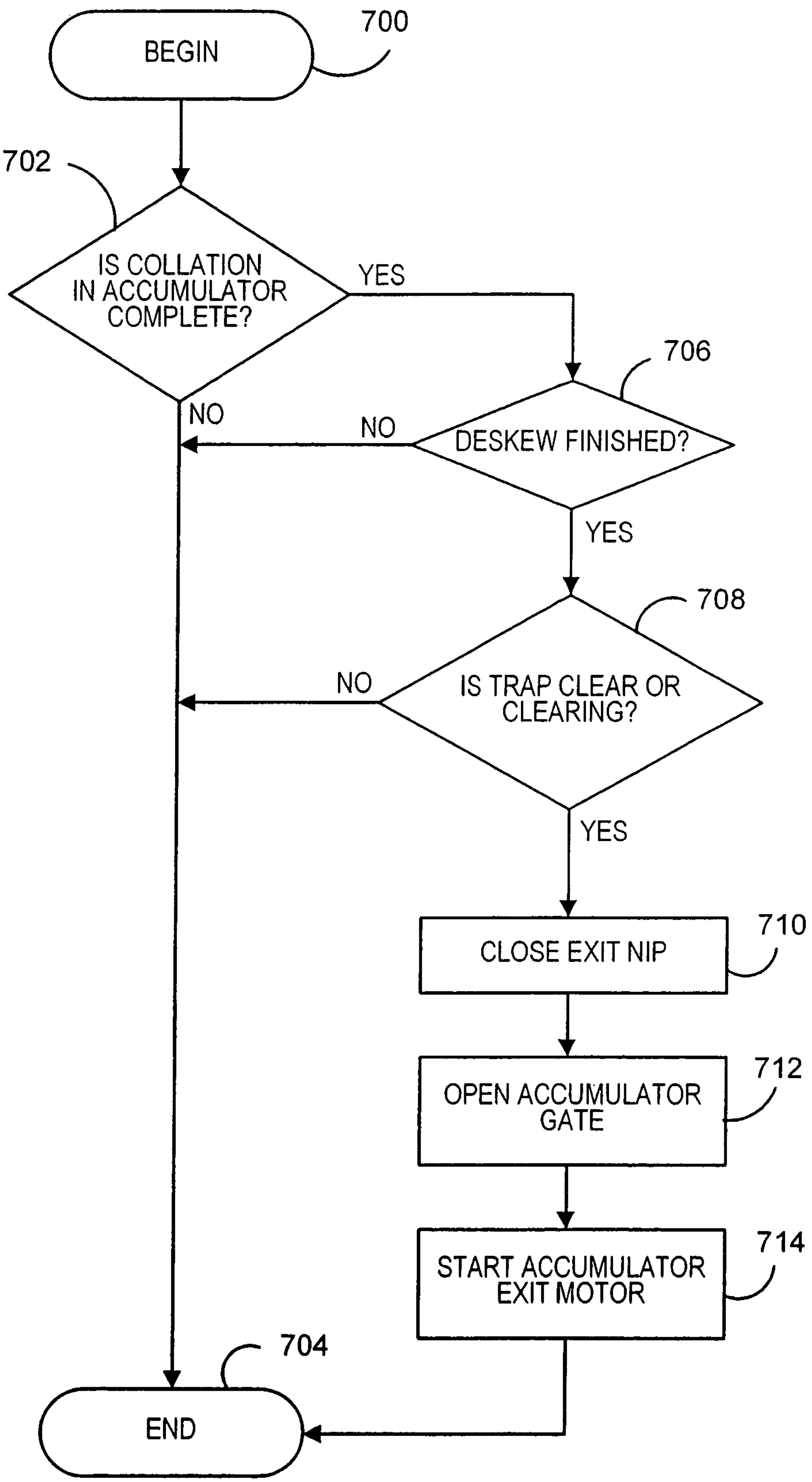
FIG. 7 is a flow chart that illustrates another control function of the control module.

FIG. 7 is a flow chart that illustrates logic employed by the inserter control module in controlling the accumulator sheet storage position 412 of the sheet buffer. The process of FIG. 7 begins at 700 and advances to decision block 702. At decision block 702, it is determined whether the collation in the accumulator is complete (which may occur with a single sheet collation as well as a multi-sheet collation). If a negative determination is made at decision block 702, the process ends 704 and then may loop back to 700. If a positive determination is made at 702, then decision block

706 follows. At decision block 706, it is determined whether deskewing of the collation is complete. If not, the process ends 704 and may loop back to 700. If it is determined at decision block 706 that deskewing is complete, then decision block 708 follows. At 708 it is determined whether the sheet storage position immediately downstream from the accumulator is clear or is being cleared. If not, the process ends 704 and may loop back to 700. If a positive determination is made at 708, then the exit nip is closed (710), the accumulator gate is opened (712), and the accumulator exit motor is started (714). Then the process ends 704.

FIG. 8 is a block diagram representation of an alternative embodiment of the mail creation system (indicated generally by reference numeral 100*a* in FIG. 8). In the embodiment of FIG. 8, the inserter control module may include a buffer for print data, and the PC 102*a* may provide the print data to the print data buffer 198 in the inserter control module 112*a* containing master controller 112, from where the print data is selectively downloaded to the printer 104. The inserter control module may control ("throttle") its own print data buffer 198 in response to the availability of sheet storage space in the sheet buffer 106, in like manner to the inserter control module throttling the language monitor in the embodiment of FIGS. 1-4. In the embodiment of FIG. 8, the language monitor need not be present in the PC 102*a*, or may be completely conventional—i.e., not modified so as to be controlled by the inserter control module. Thus in this case the source of print data (print data buffer) for the printer is integrated with the inserter control module, with the PC serving as an ultimate source of data which supplies print data to the print data buffer portion of the inserter control module. The relevant software portion(s) of the PC may interact with the print data buffer portion of the inserter control module as if the print data buffer portion of the inserter control module were a printer.

Figure 9:
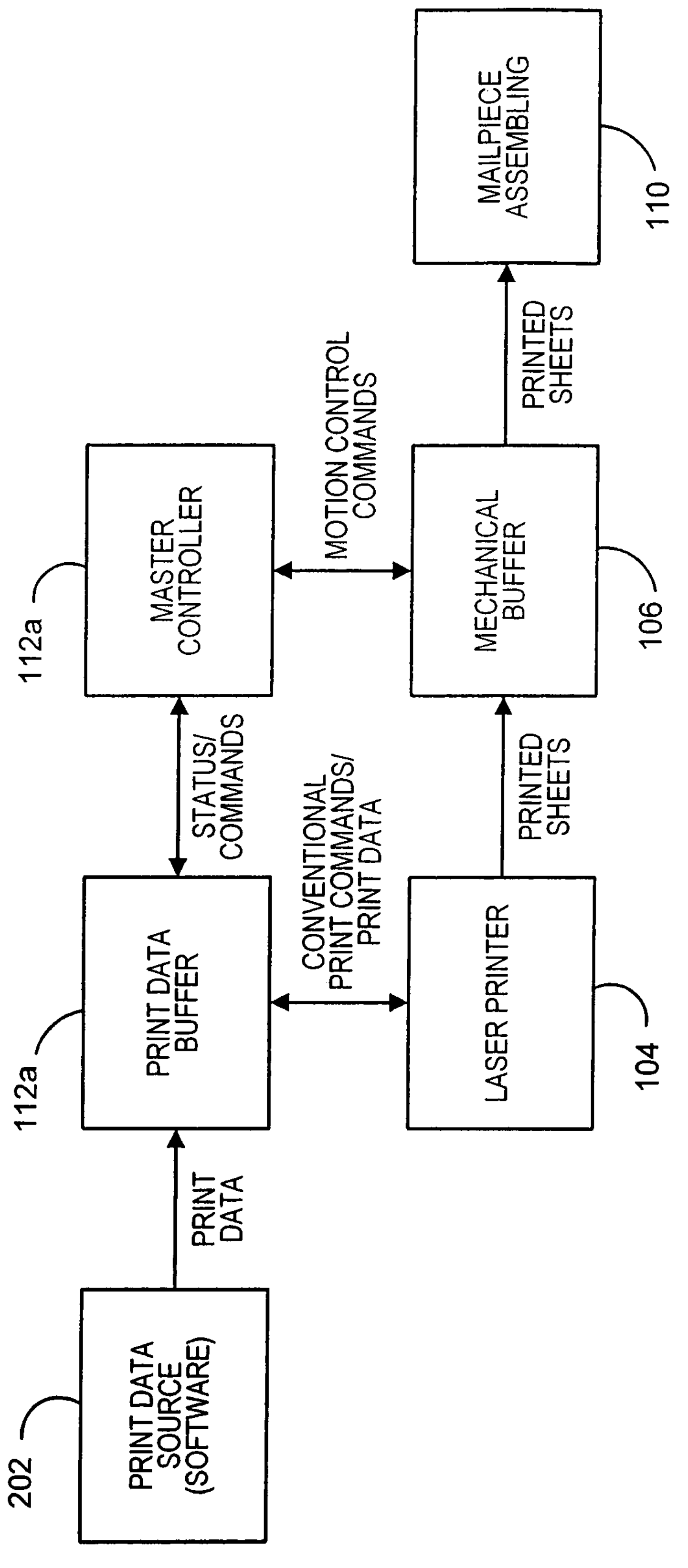
FIG. 9 is a diagram similar to FIG. 2 showing data and other flows among functional components of the mail-creation system of FIG. 8.

FIG. 9 is a diagram that shows data flows, etc. in the mail creation system of FIG. 8. In this diagram, it will be recognized that the function performed by the language monitor 204 in FIG. 2 is taken over by the print data buffer portion of the inserter control module in FIG. 9.

The inventors have found that with a buffer size of six sheets (disregarding potential multi-sheet collations) and a print data source throttle control technique as described in connection with FIGS. 1-7, the mail creation system can gracefully and efficiently handle situations in which either the inserter runs faster than the printer or the printer runs faster than the inserter, even in case of hesitations or jams in the inserter. The throttle control technique is applicable to, and will promote efficient operation of, most if not all printers that may be desired to be incorporated in the mail creation system. Various types of printers may be employed, without changing the control algorithm. Among the printing technologies that may be employed are ink jet or laser, monochrome or color, simplex or duplex, and any combination of these technologies. The printer may be a laser printer, an ink jet printer, a color printer, or a duplex printer (i.e., one which prints on both sides of at least some of the sheets). Moreover, the teachings of the present invention may also be applied to a printer which prints envelopes supplied to an inserter base. In such a case, an envelope buffer may be present between the envelope printer and the inserter, and the providing of envelope print data to the envelope printer may be "throttled" according to the extent of available space in the envelope buffer.

The inherent flexibility of the control algorithm described herein readily accommodates exchanging one type or model of printer for another in the document creation system.

If the buffer size were increased from six sheets, the system performance (throughput) may be enhanced in some cases, but at the cost of possibly more expense in manufacturing the buffer and greater space required for the buffer. If the buffer size were reduced from six, cost and space may be saved with respect to the buffer, but the system performance may be adversely affected.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A system comprising:

a data source device that generates print data for individual pages to be printed;

a printer operatively coupled to the data source to receive the print data and to use the print data to print the individual pages;

a buffer coupled to the printer for receiving the printed individual pages from the printer and temporarily storing the printed individual pages;

a mail-assembling device including a controller that controls operation of the mail-assembling device, the controller operatively coupled to the buffer to determine on a continuous basis the number of printed individual pages in the buffer and operatively coupled to the data source to throttle on a continuous basis the release of individual pages of print data generated by the data source to the printer based on the determined number of pages in the buffer.

2. A system as set forth in claim 1, wherein the data source is a personal computer.

3. A system as set forth in claim 2, wherein the mail-assembling device is an inserter.

4. A system as recited in claim 3 wherein the individual pages of print data are throttled in a burst mode so that as many individual pages of print data as possible are provided as fast as possible to the printer consistent with not overfilling the buffer and thereby maximizing printer throughput.

* * * * *